Patented Feb. 16, 1954

2,669,592

UNITED STATES PATENT OFFICE 2,669,592

LIGNIN-REINFORCED RUBBER

Donald Wesley MacGregor, Cornwall, Ontario, and Thomas Raymond Griffith, Ottawa, Ontario, Canada, assignors, by mesne assignments, to Howard Smith Paper Mills Limited, Montreal, Quebec, Canada No Drawing. Application August 24, 1951, Serial No. 243,594

9 Claims. (Cl. 260—756)

This invention relates to improvements in the compounding of rubber, and to the production of lignin-reinforced vulcanizates having a satisfactory curing rate together with exceptionally high tensile strength, resilience and other valuable and distinctive properties.

The present invention is based on the discovery that the use of oxides of certain metals in the compounding of co-precipitated lignin-reinforced natural rubbers both shortens the curing time and greatly enhances the tensile strength, resilience and other desirable properties of the vulcanized products. It has been found that these oxides inhibit the delaying action of lignin on the vulcanization reaction. The oxides found suitable for this purpose are oxides of metals. The sulphides of which will precipitate in an acid solution, are insoluble except in small quantities in either sodium polysulphide or ammonium polysulphide and are stable in the presence of HCl and include copper oxide, litharge, red lead, brown lead and bismuth trioxide. The selected oxide or oxides may be added to the lignin before the latter is incorporated into the rubber or, alternately, the oxides may be withheld from the co-precipitation step and added at the rubber mill. The latter procedure seems to give the best results and is preferred.

In addition to producing lignin-reinforced natural rubbers having a satisfactory curing rate, the present invention greatly improves the tensile strength, resilience and other properties of natural lignin-reinforced rubbers to an extent never before obtained. By the use of this invention it has been found possible to produce lignin-reinforced vulcanized rubber having a tensile strength as high as and over 5000 lbs. per square inch and a Bashore resilience as high as 65%. In comparison with this, the tensile strength of a standard carbon black formulation when prepared under the most favourable conditions, is around 4200 lbs. per square inch with a much lower Bashore resilience. Lignin successfully used in the practice of the invention includes soda lignin and kraft lignin derived from soft and hard woods.

Prior to our invention, the use of copper oxide was considered to cause poor ageing and to be deleterious to rubber compounds and was avoided. The use of litharge in the compounding of rubber has been practically discarded in favour of zinc oxide. In the case of lignin-reinforced natural rubber, the use of zinc oxide in the formulations previously employed gave poor curing results. It was, therefore, quite contrary to the indications of prior art teachings with respect to the use of metals in rubber compounding to discover that the addition of metals such as copper oxide, litharge, red lead, brown lead and bismuth trioxide not only shortened the time of curing of lignin-reinforced rubber, but also substantially improved both the tensile strength and resiliency of the vulcanized product.

Lignin-rubber masterbatches used in producing lignin-reinforced vulcanizates in accordance with our invention may be prepared by adding an alkaline solution of lignin to rubber latex and simultaneously coagulating, during agitation, the lignin and rubber with a precipitating solution containing sodium chloride and sulphuric acid or other suitable coagulant.

The mixing of ingredients is carried out in the usual manner well known in the art and may conveniently be accomplished on a rubber mill.

The lignin-rubber masterbatch is homogenized in the usual way by placing the masterbatch on the mill and continuing the milling until the masterbatch is homogenized, i. e., until the rubber forms a smooth sheet on the front roll and a bank in the nip of the rolls. At this stage the other compounding ingredients such as the metallic oxides, sulphur and accelerator are added.

Vulcanization may be carried out in a mold under pressure in the usual manner and at any convenient temperature at which vulcanization will take place. The temperature employed for the formulations given in the examples hereinafter referred to may be from 220° F. to 350° F. The figures herein given for tensile strength, resilience, etc., of vulcanizates produced with such formulations were obtained by following the standard procedure recommended in A. S. T. M. D.15–41.

We have found it advisable to calculate the metallic oxide in our improved rubber compounds as a percentage of the lignin. The amount of oxide is increased as the amount of lignin is increased. The amount of lignin present in a formulation may be as low as about 5 parts by weight of lignin to 100 parts by weight of rubber. Highest loadings prepared in test mixes were of the order of 250 parts by weight of lignin to 100 parts by weight of rubber. Higher lignin loadings are feasible where necessary or desirable.

The optimum loading of a metallic oxide such as litharge may be 5 to 7 parts by weight of the oxide in a compound containing 40 parts by weight of lignin to 100 parts by weight of rubber or about 17.5% based on total lignin in the compound. It is difficult to definitely fix a possible minimum amount of oxide present in a mix since even 1 part by weight of litharge to 40 parts by weight of lignin has been found to be beneficial. So far as can be determined, the lower limit of metallic oxide is probably around 0.5 parts (about 1%) by weight or lower of lignin.

The practical maximum amount of an oxide, for economical reasons, seems to be about 15 parts or 37.5% by weight based on the total lignin per 100 parts by weight of rubber. However, beneficial effects may be obtained at higher oxide concentrations.

It is important to note at this point that the improvement in rubber afforded by our invention is due to the presence of a new composite compounding ingredient consisting of lignin and an oxide selected from the oxides of metals having the distinguishing characteristics hereinbefore specified, the oxide being present in the proportion of about 1 part by weight to 4 to 12 parts by weight of lignin. Other ingredients ordinarily employed in the compounding and vulcanization of rubber are also used in our improved formulations, as shown by various examples hereinafter referred to.

Zinc oxide has been used in earlier vulcanization processes as an activator and may be used in our process for the same purpose. Litharge, red lead and brown lead act in our formulations both as an inhibitor to overcome delaying effects "of lignin" on the rubber cure and as an activator whereas copper and bismuth trioxide are not activators. Because of the superior activating qualities of zinc oxide, it is preferably used in the formulations even when lead oxides are present.

The optimum quantity of zinc dimethyl dithiocarbamate (Zimate) necessary in the presence of lignin is one part by weight to 100 parts by weight of a compound containing 40 parts of lignin, or 2.5% based on the lignin in the compound. As little as or less than 0.1 part per 100 parts by weight of rubber or 0.25% based on the lignin produces a beneficial effect in vulcanization of rubber.

The sulphur content in the formulation is also dependent on the total quantity of lignin. The content of sulphur in soft rubber containing lignin ranges from about 0.75% to about 14½% based on rubber. To minimize the ageing it is preferred to keep the sulphur content at the lowest value consistent with satisfactory vulcanization. About 2 parts by weight of sulphur per 100 parts by weight of rubber is preferred when the lignin is not above 40 parts by weight per 100 parts by weight of rubber. It is beneficial to increase the sulphur content when the lignin is higher than 40 parts by weight per 100 parts by weight of rubber. Beyond this loading the sulphur should be increased by approximately 3% of any lignin above 40 parts by weight per 100 parts by weight of rubber.

The percentages given above are not necessarily constant. Such percentages are given merely to illustrate that the quantities of variable ingredients increase with the increase in quantity of lignin in the compound.

The invention is further illustrated by the following tables and examples.

Table 1 shows the practical percentages of metallic oxide, zinc dimethyl dithiocarbamate, and sulphur, based on lignin loadings.

TABLE 1

| Ingredients | Optimum Percentage | Minimum Percentage | Maximum Percentage |
|---|---|---|---|
| Metallic oxide | 14–20 | 0.2 | 40. |
| Zinc dimethyl dithiocarbamate. | 2.5 | 0.25 | 7.5. |
| Sulphur [1] (in addition to amount required for the rubber itself). | 3.0 | 0.10 | 6 (soft rubber). |

[1] Based on any lignin over 40 parts by weight per 100 parts by weight of rubber.

The curing characteristics of natural rubber containing lignin and metallic oxide as described were obtained with the formulation shown in the following examples:

Example 1

Parts by weight

| | |
|---|---|
| Lignin masterbatch [1] | 150 |
| Stearic acid | 2 |
| Phenyl-beta-naphthylamine (Neozone D), antioxidant | 1 |
| Litharge | 20 |
| Zinc dimethyl dithiocarbamate (Zimate), organic accelerator | 1.5 |
| Sulphur | 4 |

[1] Is 50 parts by weight of lignin co-precipitated with 100 parts by weight of rubber.

This formulation gave a cure in 15 minutes at 292° F. The tensile strength was 4160 pounds per square inch and the resilience was 58%.

A relatively large quantity of litharge was used in this example. The litharge in the next example was reduced and zinc oxide was added to the formulation as an activator of rubber vulcanization.

Example 2

Parts by weight

| | |
|---|---|
| Lignin masterbatch [1] | 120 |
| Smoked sheet [2] | 20 |
| Stearic acid | 2 |
| Phenyl-beta-naphthylamine (Neozone D), antioxidant | 1 |
| Zinc oxide | 3 |
| Litharge | 7 |
| Zinc dimethyl dithiocarbamate (Zimate), organic accelerator | 1 |
| N-cyclohexyl-2-benzothiazole sulfenamide (Santocure) accelerator | 0.5 |
| Sulphur | 2 |

[1] 40 parts by weight of lignin co-precipitated with 80 parts by weight of rubber.
[2] Added to make rubber total equal to 100.

The time of cure in this experiment was 40 minutes at 272° F. The tensile strength obtained was 5040 pounds per square inch and the Bashore resilience was 49%.

In the following example is shown a general formulation for various lignin loadings.

Example 3

Parts by weight

| | |
|---|---|
| Lignin masterbatch | ([1]) |
| Stearic acid | 2 |
| Phenyl-beta-naphthylamine (Neozone D), antioxidant | 1 |
| Zinc oxide | 3 |
| N-cyclohexyl-2-benzothiazole sulfenamide (Santocure), accelerator | 0.5 |
| Sulphur | 2 |
| Additional sulphur | [2]3 |
| Litharge | [3]17.0 |
| Zinc dimethyl dithiocarbamate (Zimate), accelerator | [3]2.5 |

[1] Natural rubber–100 lignin—variable.
[2] This figure is a percentage based on any lignin above 40 parts by weight per 100 parts by weight of rubber.
[3] These figures are percentages based on total lignin present in the rubber compound.

For a lignin loading of 75 parts by weight on 100 parts by weight of rubber the cure occurred in 20 minutes at 282° F. The tensile strength was 4000 pounds per square inch.

Example 4 with a lignin loading of 36.1 parts by weight is equivalent in volume to 50 parts by weight of carbon black. A comparison showing the improvement of lignin and litharge with rubber over rubber and carbon black is given in this example.

*Example 4*

|  | Parts by weight | |
|---|---|---|
| Lignin masterbatch | | 1 108.3 |
| Smoked sheet | | 2 27.8 |
| Micronex standard (Channel black) | 100 | |
| Stearic Acid | 50 | |
| Neozone D, antioxidant | 2 | 2 |
| Pine Tar | 2 | 2 |
| Zinc oxide | 6 | |
| Litharge | 3 | 3 |
| Santocure, accelerator | | 7 |
| Methyl Zimate, accelerator | 0.7 | 0.5 |
| Sulphur | | 1.0 |
|  | 2.25 | 2 |

¹ Contains 36.1 parts by weight of lignin.
² Added to make rubber equal 100.

| Cure (282° F.) | Carbon Black | | Lignin | |
|---|---|---|---|---|
|  | Tensile (p.s.i.) | Bashore resilience (percent) | Tensile (p.s.i.) | Bashore resilience (percent) |
| 10 minutes | 2,775 | 26 | 4,285 | 57 |
| 20 minutes | 3,735 | 27 | 4,865 | 60 |
| 30 minutes | 3,735 | 27 | 4,600 | 60 |
| 40 minutes | 3,600 | 27 | 4,545 | 60 |

*Example 5*

The table below shows the effectiveness of particular metallic oxides of equal quantity.

| | Parts by weight |
|---|---|
| Lignin masterbatch¹ | 108.3 |
| Smoked sheet² | 27.8 |
| Stearic acid | 2.0 |
| Zinc oxide | 3 |
| A, B, C, D or E³ | 7.0 |
| Methyl Zimate accelerator | 1.0 |
| Santocure, accelerator | 0.5 |
| Sulphur | 2.0 |

¹ As in Example 4.
² As in Example 4.
³ A—litharge; B—red lead oxide; C—brown lead oxide; D—copper oxide; E—bismuth trioxide.

|  | Cure at 282° F., minutes | Tensile (p.s.i.) | Bashore resilience (percent) |
|---|---|---|---|
| A | 10 | 4,200 | 44 |
| B | 10 | 3,075 | 45 |
| C | 10 | Slight cure | |
| D | 10 | 4,565 | 46 |
| E | 10 | 3,910 | 44 |
| A | 20 | 4,800 | 48 |
| B | 20 | 4,100 | 52 |
| C | 20 | 3,465 | 55 |
| D | 20 | 4,480 | 48 |
| E | 20 | 3,720 | 46 |
| A | 30 | 4,460 | 51 |
| B | 30 | 4,150 | 53 |
| C | 30 | 4,210 | 57 |
| D | 30 | 4,045 | 48 |
| E | 30 | 3,555 | 46 |
| A | 40 | 4,495 | 50 |
| B | 40 | 3,855 | 52 |
| C | 40 | 4,100 | 60 |
| D | 40 | 4,000 | 47 |
| E | 40 | 3,545 | 46 |

*Example 6*

The table below shows the effectiveness of various quantities of litharge at various times of cure.

| | Parts by weight |
|---|---|
| Lignin masterbatch¹ | 108.3 |
| Smoked sheet² | 27.8 |
| Stearic acid | 2.0 |
| Zinc oxide | 3 |
| A, B, C, D, E, F³ | Variable |
| Methyl Zimate | 1.0 |
| Santocure | 0.5 |
| Sulphur | 2.0 |

¹ As in Example 4.
² As in Example 4.
³ A—1 part; B—2 parts; C—3 parts; D—4 parts; E—5 parts; F—7 parts.

|  | Cure (282° F), minutes | Tensile (p.s.i.) | Bashore resilience (percent) |
|---|---|---|---|
| A | 10 | 2,010 | 45 |
| B | 10 | 2,775 | 47 |
| C | 10 | 3,280 | 49 |
| D | 10 | 3,505 | 51 |
| E | 10 | 3,945 | 50 |
| F | 10 | 4,285 | 57 |
| A | 20 | 3,105 | 44 |
| B | 20 | 3,840 | 48 |
| C | 20 | 4,175 | 53 |
| D | 20 | 4,390 | 55 |
| E | 20 | 4,550 | 56 |
| F | 20 | 4,865 | 60 |
| A | 30 | 3,170 | 46 |
| B | 30 | 3,695 | 49 |
| C | 30 | 4,035 | 52 |
| D | 30 | 4,385 | 54 |
| E | 30 | 4,270 | 57 |
| F | 30 | 4,600 | 60 |
| A | 40 | 2,975 | 47 |
| B | 40 | 3,405 | 48 |
| C | 40 | 3,675 | 50 |
| D | 40 | 3,865 | 52 |
| E | 40 | 4,130 | 53 |
| F | 40 | 4,545 | 60 |

In the practice of this invention it is feasible to use both oxidized and unoxidized lignin. The lignin used in the procedures illustrated by the foregoing examples was an oxidized soda lignin.

As pointed out in their co-pending application Serial No. 11,853, filed February 27, 1948 (now Patent 2,610,934, Rudolf A. V. Raff and George H. Tomlinson, Jr., have discovered that, in the compounding of lignin-reinforced rubbers, both natural and synthetic, the use of oxidized lignin gives improved tensile strength as compared with the use of unoxidized lignin of the same source.

The oxidation of the oxidized lignin used in accordance with this invention may be carried out by bubbling air through an aqueous solution of lignin acid salt or lignin sodium salt or in other ways, such as by purposely oxidizing the black liquor prior to or during its precipitation treatment or by oxidizing the lignin acid salt in dry powdered form in a current of hot air or oxygen. This may be carried out with or without catalysts or through the use of specific oxidizing agents. The oxidative treatment, preferably done in a lignin solution maintained at a pH of around 10 by the occasional addition of caustic, should be continued until the melting point of the modified lignin, after precipitation and drying, is at least 240° C. Concomitant with oxidation is a decrease in the methoxyl content and an increase in the viscosity of non-aqueous solutions and for any given initial lignin, this property may be used besides the melting point as an index of adequate oxidation.

The following example compares the tensile strength and resilience of lignin-reinforced vulcanizates produced from compositions containing oxidized and unoxidized soda lignin from the same source; in each case the lignin being 36.1 parts per 100 parts by weight of rubber and otherwise compounded in accordance with Example 2.

Example 7

UNOXIDIZED SODA LIGNIN

| Cure at 282° F. | Tensile, p. s. i. | Resilience, percent |
|---|---|---|
| 10 min | 3,520 | 50 |
| 20 min | 4,535 | 53 |
| 30 min | 4,250 | 56 |
| 40 min | 4,325 | 54 |

OXIDIZED SODA LIGNIN

| Cure at 282° F. | Tensile, p. s. i. | Resilience, percent |
|---|---|---|
| 10 min | 4,200 | 49 |
| 20 min | 4,870 | 54 |
| 30 min | 4,665 | 59 |
| 40 min | 4,545 | 56 |

The following example illustrates the effect of litharge in the vulcanization of masterbatches prepared by the co-precipitation of either unoxidized or oxidized kraft lignin with natural rubber latex.

Example 8

| | | |
|---|---|---|
| Lignin masterbatch [1] | 108.3 | 108.3 |
| Smoked sheet [2] | 27.8 | 27.8 |
| Stearic acid | 2 | 2 |
| Zinc oxide | 5 | 3 |
| Litharge | | 7 |
| Methyl Zimate | 1 | 1 |
| Santocure | 0.5 | 0.5 |
| Sulphur | 2 | 2 |

[1] Contains 36.1 parts by weight of either unoxidized or oxidized kraft lignin.
[2] Added to make rubber equal 100.

UNOXIDIZED KRAFT LIGNIN

| | Without Litharge | | With Litharge | |
|---|---|---|---|---|
| | Tensile p. s. i. | Resilience, percent | Tensile, p. s. i. | Resilience, percent |
| Cure at 282° F.: | | | | |
| 10 min | 1,905 | 50 | 3,520 | 54 |
| 20 min | 2,545 | 50 | 4,720 | 58 |
| 30 min | 2,435 | 48 | 4,730 | 60 |
| 40 min | 2,210 | 49 | 4,315 | 59 |

OXIDIZED KRAFT LIGNIN

| | | | | |
|---|---|---|---|---|
| Cure at 282° F.: | | | | |
| 10 min | 2,000 | 50 | 3,635 | 57 |
| 20 min | 2,150 | 51 | 5,255 | 63 |
| 30 min | 2,105 | 51 | 4,960 | 63 |
| 40 min | 1,735 | 50 | 4,550 | 62 |

Without litharge both the unoxidized and the oxidized kraft lignin showed relatively low tensile strength.

With litharge in the formulation, the maximum tensile strength of the unoxidized lignin formulation was increased from 2545 p. s. i. to 4730 p. s. i. The maximum tensile strength of the oxidized lignin was increased from 2150 p. s. i. to 5255 p. s. i. The effect of litharge was, therefore, to increase the tensile strength and resilience with both types of lignin considerably.

These results show that litharge plus zinc oxide in a kraft lignin masterbatch formulation is much superior to zinc oxide alone, and that the litharge formulation improves considerably both unoxidized and oxidized lignin.

In the formulations described herein the reinforcing agent or filler present was lignin. Other reinforcing agents that may be used in the presence of lignin are, such as, carbon black, clay, whiting, etc.

Having thus described the nature and various embodiments of our invention, it will be understood that the present disclosure is illustrative rather than limiting and that various modifications may be resorted to within the scope and spirit of the invention as defined by the appended claims.

The embodiments of the invention in which an exclusive property or privilege is claimed are defined as follows:

1. A re-inforced vulcanizate prepared by vulcanizing a composition comprising coprecipitated natural rubber and lignin in the presence of an organic accelerator, sufficient activator selected from the group consisting of lead oxide and zinc oxide to activate said organic accelerator, sulphur and a modifier effective to inhibit the cure-delaying action of the lignin, and to substantially enhance the tensile strength and resilience of the said vulcanizate, said modifier being selected from the group consisting of the oxides of copper, lead and bismuth.

2. The vulcanizate claimed in claim 1 wherein the modifier is a lead oxide.

3. The vulcanizate claimed in claim 1 wherein the modifier is litharge.

4. The vulcanizate claimed in claim 1 wherein the modifier is red lead.

5. The vulcanizate claimed in claim 1 wherein the modifier is brown lead.

6. The vulcanizate claimed in claim 1 wherein the modifier is bismuth trioxide.

7. The vulcanizate claimed in claim 1 wherein the modifier is a copper oxide.

8. A method of vulcanizing a coprecipitated lignin natural rubber composition with comprises; compounding said composition with compounding ingredients including sulphur, an organic accelerator, an activator therefor selected from the group consisting of lead oxide and zinc oxide and a modifier selected from the group consisting of the oxides of copper, lead and bismuth; and then subjecting the resulting mixture to vulcanization.

9. A method as claimed in claim 8 wherein said compounding ingredients include zinc oxide as an activator for said organic accelerator.

DONALD WESLEY MACGREGOR.
THOMAS RAYMOND GRIFFITH.

References Cited in the file of this patent

UNITED STATES PATENTS

| Number | Name | Date |
|---|---|---|
| 1,217,157 | Coughlin | Feb. 27, 1917 |
| 1,844,306 | Williams | Feb. 9, 1932 |
| 2,355,180 | Remy | Aug. 8, 1944 |
| 2,572,884 | Pollak | Oct. 30, 1951 |
| 2,575,061 | McMahon | Nov. 13, 1951 |
| 2,608,537 | Pollak | Aug. 26, 1952 |

OTHER REFERENCES

Rubber Age (New York) of November, 1948, pp. 197–200.